United States Patent
Zagel et al.

(10) Patent No.: US 10,417,825 B2
(45) Date of Patent: *Sep. 17, 2019

(54) INTERACTIVE CUBICLE AND METHOD FOR DETERMINING A BODY SHAPE

(71) Applicant: adidas AG, Herzogenaurach (DE)

(72) Inventors: Christian Zagel, Herzogenaurach (DE); Jochen Bjoern Suessmuth, Herzogenaurach (DE); Lukas Malcher, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 408 days.

This patent is subject to a terminal disclaimer.

(21) Appl. No.: 15/265,811

(22) Filed: Sep. 14, 2016

(65) Prior Publication Data

US 2017/0004657 A1    Jan. 5, 2017

Related U.S. Application Data

(63) Continuation of application No. 14/196,925, filed on Mar. 4, 2014, now Pat. No. 9,477,980.

(30) Foreign Application Priority Data

Mar. 4, 2013   (DE) .................. 10 2013 203 667

(51) Int. Cl.
*G06Q 30/00*    (2012.01)
*G06T 19/00*    (2011.01)
(Continued)

(52) U.S. Cl.
CPC ............ *G06T 19/006* (2013.01); *A63F 13/08* (2013.01); *A63F 13/10* (2013.01); *A63F 13/12* (2013.01);
(Continued)

(58) Field of Classification Search
CPC ................ G06Q 30/0601–0645; G06Q 30/08
(Continued)

(56) References Cited

U.S. PATENT DOCUMENTS 7,184,047 B1    2/2007   Crampton et al.
7,953,648 B2    5/2011   Vock
(Continued)

FOREIGN PATENT DOCUMENTS

GB      2488237        8/2012
WO    2010094688    8/2010

OTHER PUBLICATIONS

ElectricTV, Bodymetrics virtual clothing try-on with your personal 3d fashion avatar, Uploaded on Jan. 15, 2012; accessed on Jan. 5, 2015 at [https://www.youtube.com/watch?v=mWQ_InW-Zvs] (Year: 2012).*

(Continued)

*Primary Examiner* — Resha Desai
*Assistant Examiner* — Lindsey B Smith
(74) *Attorney, Agent, or Firm* — Kilpatrick Townsend & Stockton LLP

(57) ABSTRACT

A cubicle for trying on one or more items of clothing and a method for determining a body shape are described. A cubicle includes a display of an avatar with one or more items of clothing, and an interaction unit for a user to modify the items of clothing. The method includes gathering the spatial coordinates of a plurality of points on the surface of the dressed person and body parameters that at least partly define the body shape to be determined.

20 Claims, 7 Drawing Sheets

(51) Int. Cl.
G06Q 30/06 (2012.01)
A63F 13/40 (2014.01)
A63F 13/25 (2014.01)
A63F 13/35 (2014.01)
G06K 9/00 (2006.01)
A63F 13/90 (2014.01)
A63F 13/30 (2014.01)
A63F 13/655 (2014.01)
G06T 11/60 (2006.01)
G06F 3/01 (2006.01)
G06F 3/16 (2006.01)

(52) U.S. Cl.
CPC ............ *A63F 13/25* (2014.09); *A63F 13/35* (2014.09); *A63F 13/40* (2014.09); *A63F 13/655* (2014.09); *G06K 9/00369* (2013.01); *G06Q 30/0601* (2013.01); *G06Q 30/0623* (2013.01); *G06Q 30/0641* (2013.01); *G06Q 30/0643* (2013.01); *G06T 11/60* (2013.01); *G06T 19/00* (2013.01); *A63F 2300/5553* (2013.01); *A63F 2300/8082* (2013.01); *G06F 3/017* (2013.01); *G06F 3/167* (2013.01); *G06T 2210/16* (2013.01)

(58) Field of Classification Search
USPC .............................................. 705/26.1–27.2
See application file for complete search history.

(56) References Cited

U.S. PATENT DOCUMENTS

| | | |
|---|---|---|
| 2003/0101105 A1 | 5/2003 | Vock et al. |
| 2006/0116555 A1 | 6/2006 | Pavlidis et al. |
| 2009/0289775 A1 | 11/2009 | Kubota et al. |
| 2010/0111370 A1 | 5/2010 | Black et al. |
| 2011/0246329 A1 | 10/2011 | Geisner et al. |
| 2012/0062555 A1 | 3/2012 | O'Connor et al. |
| 2012/0086783 A1 | 4/2012 | Sareen et al. |
| 2012/0299912 A1 | 11/2012 | Kapur et al. |
| 2013/0202267 A1 | 8/2013 | Khromov et al. |
| 2014/0176565 A1 | 6/2014 | Adeyoola et al. |
| 2014/0249961 A1 | 9/2014 | Zagel et al. |

OTHER PUBLICATIONS

Bau et al., TeslaTouch: Electrovibration for Touch Surfaces, UIST'10, Oct. 3-6, 2010, New York, New York, USA. (Year: 2010).*
Wallace, J. (2002). Scanner dresses body image in virtual clothes. (laser triangulation). Laser Focus World, 38(10), 15(3). Retrieved from https://dialog.proquest.com/professional/docview/674466019?accountid=142257 (Year: 2002).*
Wikipedia, Internet Enzyklopadie, Virtual Dressing Room, http://en.wikipedia.org/w/index.php?title=virtual_dressing_rooms&oldid=531858520.
* U.S. Appl. No. 14/196,925, Final Office Action, dated Aug. 6, 2015, 16 pages.
* U.S. Appl. No. 14/196,925, Non-Final Office Action, dated Feb. 23, 2015, 19 pages.
* U.S. Appl. No. 14/196,925, Non-Final Office Action, dated Jan. 12, 2016, 33 pages.
* U.S. Appl. No. 14/196,925, Notice of Allowance, dated Jun. 14, 2016, 10 pages.
Anguelov, D., et al., SCAPE: Shape Completion and Animation of People, ACM Transactions on Graphics (TOG), ACM, 2005, p. 408-416.
Balan, A., et al., The Naked Truth: Estimating Body Shape Under Clothing, Computer Vision—ECCV 2008, Springer Berlin Heidelberg, 2008, p. 1-14.
Bau et al., "TeslaTouch: Electrovibration for Touch Surfaces", Proceedings of the 23nd annual ACM symposium on User interface software and technology, UIST '10 http://www.chrisharrison.net/projects/teslatouch/teslatouchUIST2010.pdf, Oct. 3-6, 2010.
ElectricTV , "Bodymetrics virtual clothing try-on with your personal 3d fashion avatar", Available online on: https://www.youtube.com/watch?v=mWQ_InW-Zvs, Jan. 15, 2012.
European Application No. 14157005.1, Extended European Search Report, dated Jun. 16, 2015, 15 pages.
Östman, The "smart fitting room" concept, RFID Arena, retrieved from the Internet: URL: http://rfidarena.com/2013/1/3/the-%E2%80%9Csmart-fitting-room%E2%80%9D-concept.aspx [retrieved on Mar. 16, 2015], Jan. 3, 2015, pp. 1-10.
Takahashi , "Virtual shopping with Bodymetrics will show how outfits fit on your body", VentureBeat, http://venturebeat.com/2012/01/12/virtual-shopping-with-bodymetrics-shows-where-outfits-will-be-too-tight-on-your -body/, Jan. 12, 2012, pp. 1-4.
IP.COM Inc., System and method for a equipping a garment retail store with digital dressing room that will offer a highly personalized and interactive shopping experience, IP.COM Journal, West Henrietta, NY, US, May 30, 2008, 7 pages.

* cited by examiner

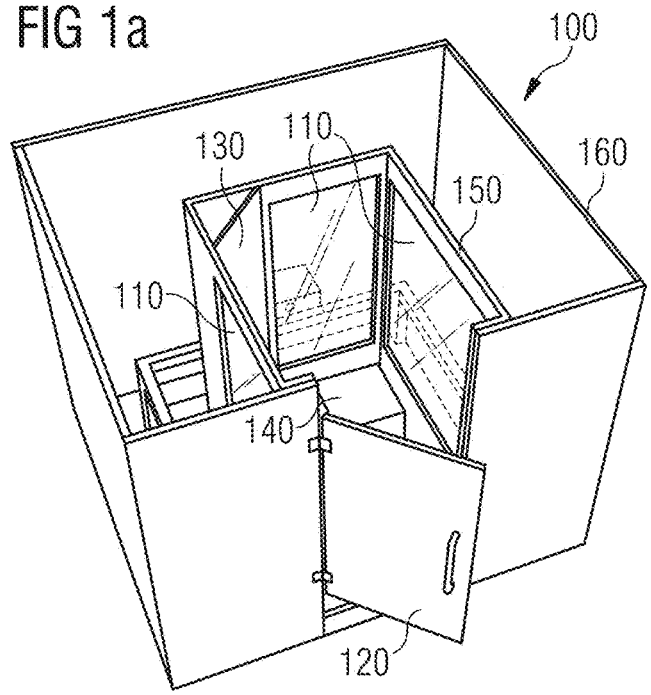
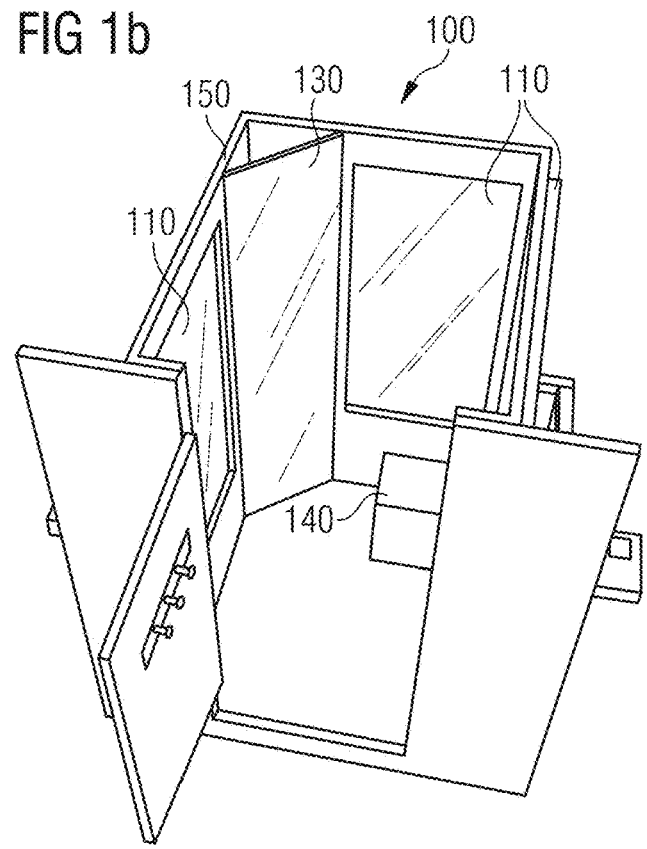

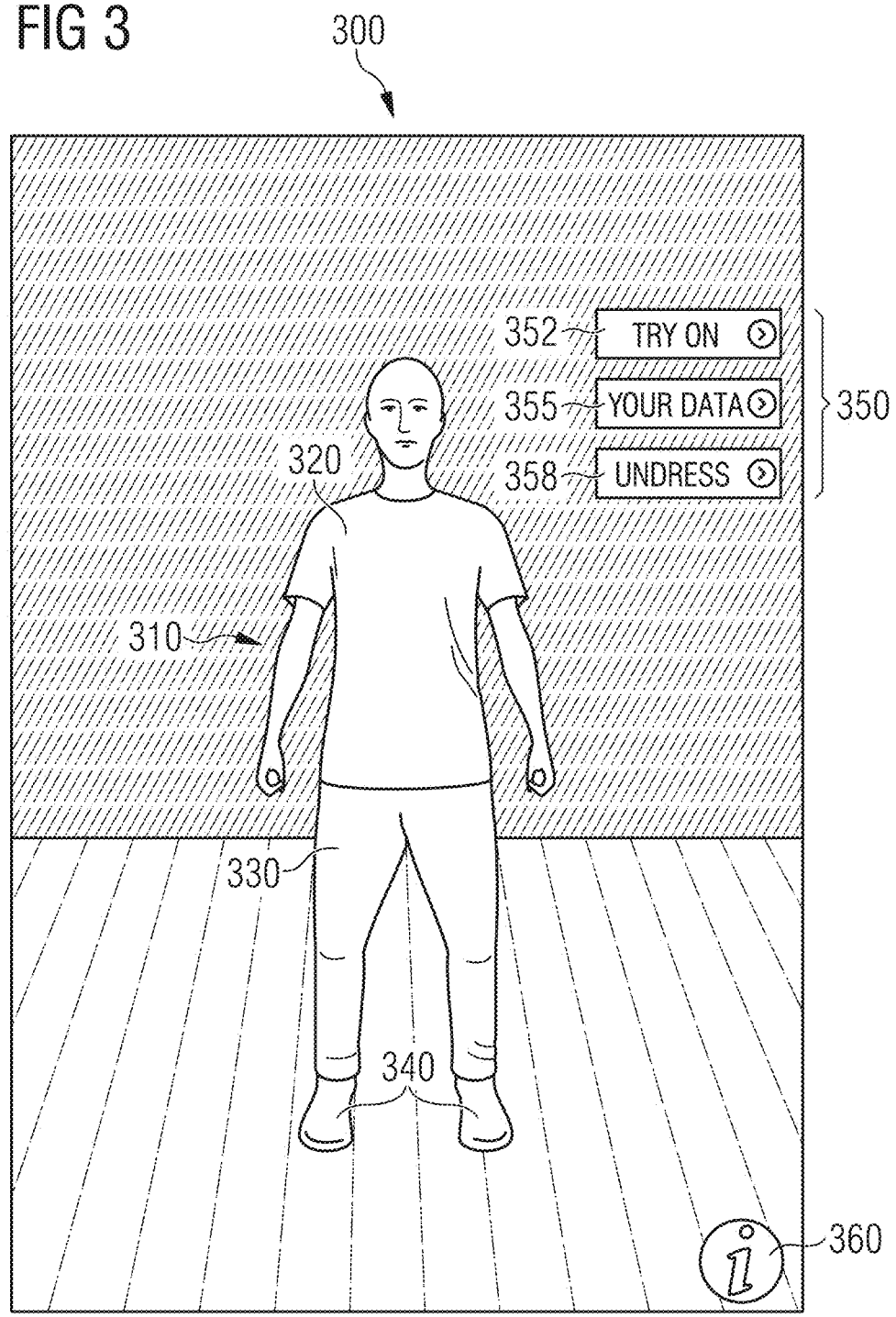

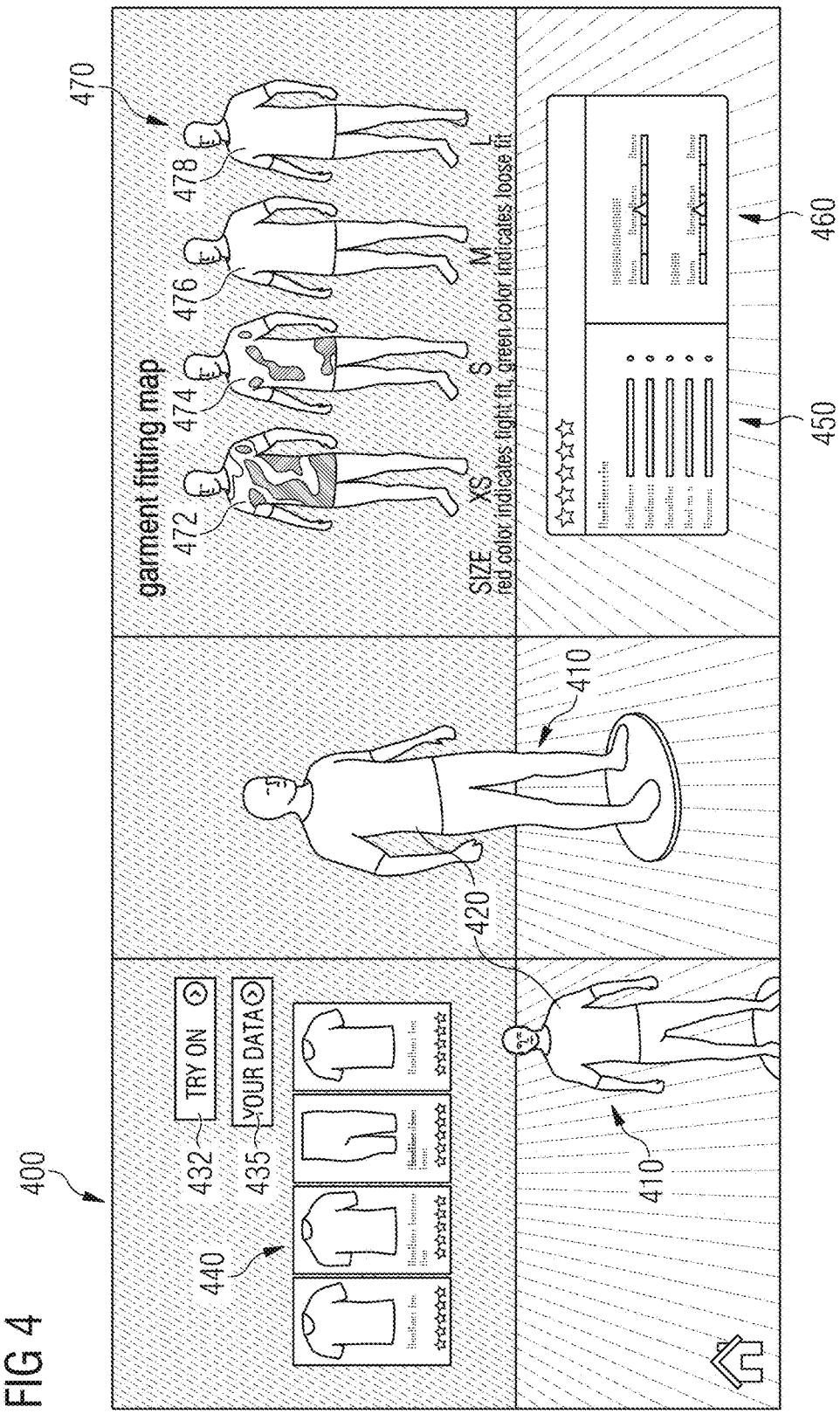

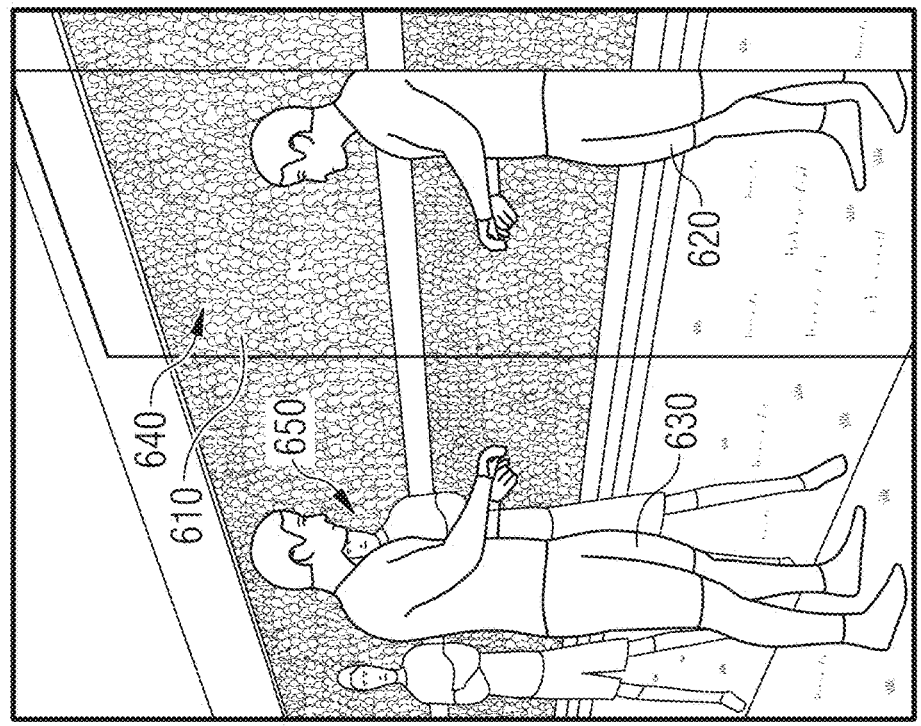
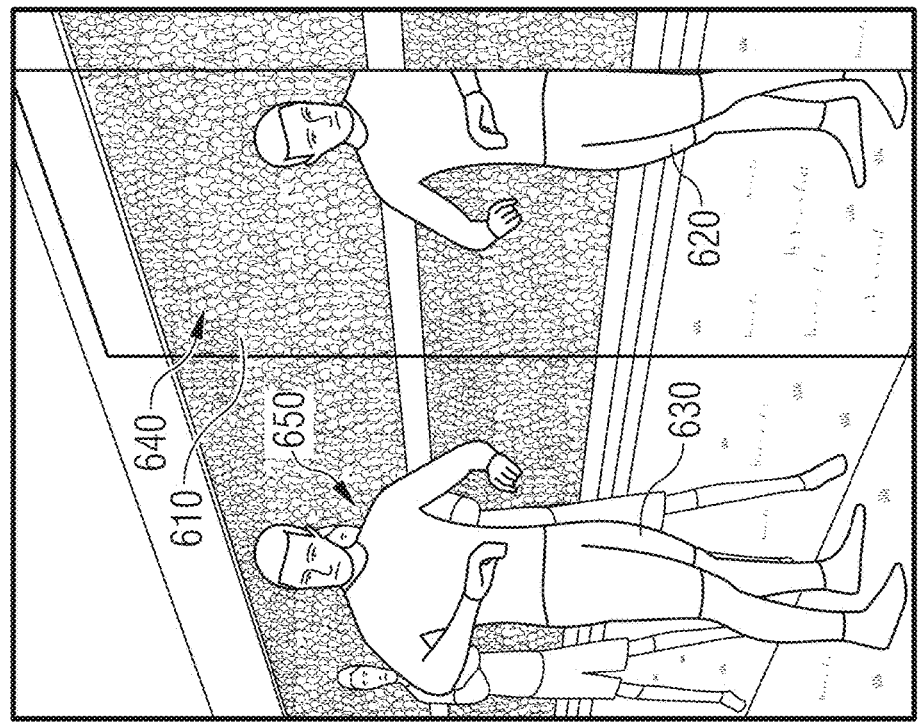

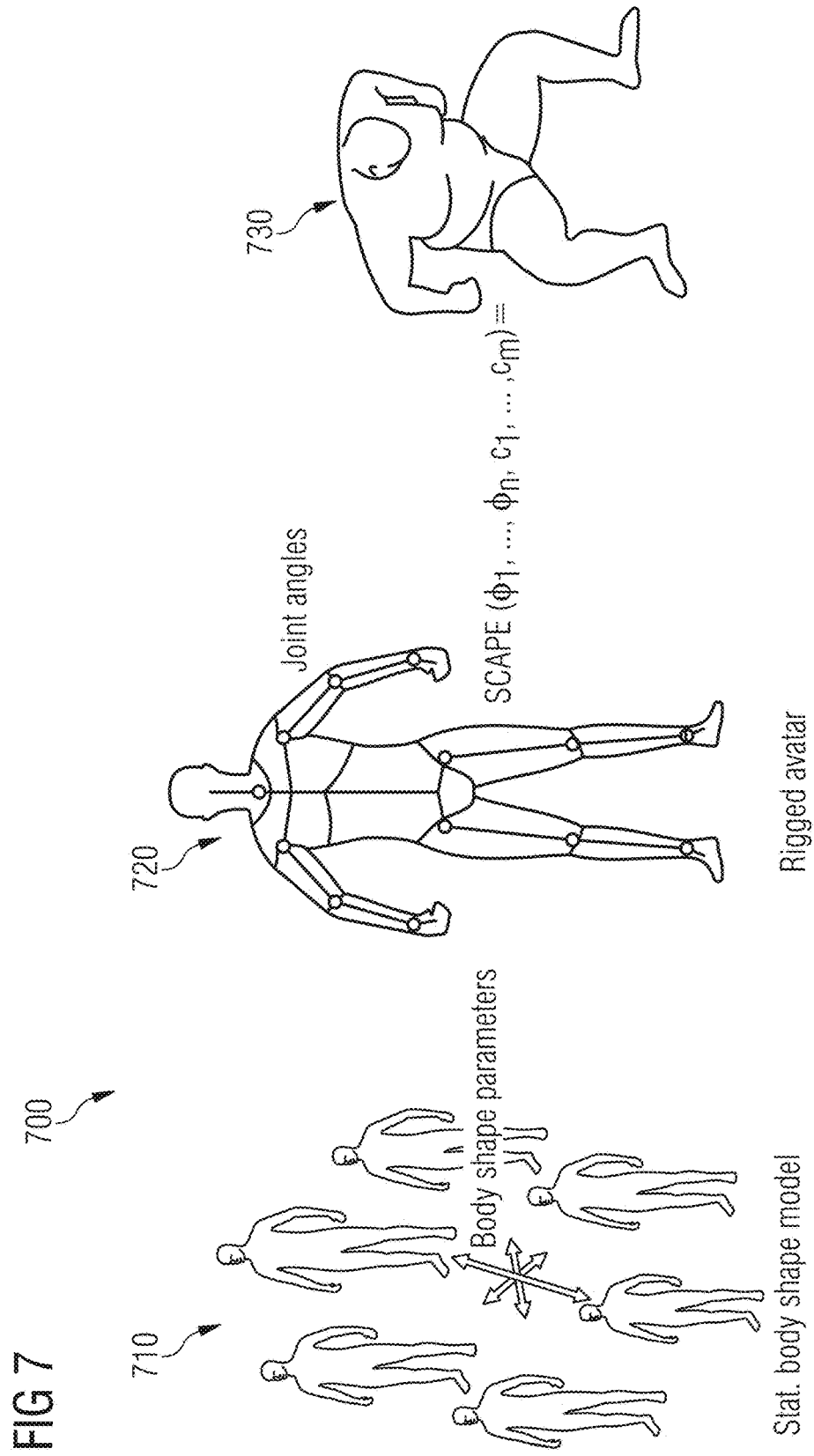

INTERACTIVE CUBICLE AND METHOD FOR DETERMINING A BODY SHAPE

CROSS REFERENCE TO RELATED APPLICATION

This application is a continuation of U.S. patent application Ser. No. 14/196,925 (allowed), filed on Mar. 4, 2014, entitled INTERACTIVE CUBICLE AND METHOD FOR DETERMINING A BODY SHAPE, which is related to and claims priority benefits from German Patent Application No. DE 10 2013 203 667.1, filed on Mar. 4, 2013, entitled INTERACTIVE CUBICLE AND METHOD FOR DETERMINING A BODY SHAPE ("the '667 application"), both of which are hereby incorporated in their entireties by this reference.

FIELD OF THE INVENTION

The present invention relates to a cubicle for trying on one or more items of clothing and a method for determining a body shape.

BACKGROUND

Changing cubicles may be found in a great number of shops such as, e.g., clothing stores or sports shops, in order to enable a client to try on one or more items of clothing. Common changing cubicles mainly serve to create a closed, private zone where the user of the changing cubicle may put off at least a part of the clothes he wears in order to try on items of clothing that interest him.

A disadvantage of common changing cubicles is that the user has to undress at least partly before trying on items of clothing that interest him. Furthermore, the user may be allowed to take only a limited number of items of clothing to the changing cubicle, said items of clothing, in addition, having to be at hand in the store at that particular time. In case the items of clothing taken to the cubicle do not fit the user or are not to the user's liking, the user first has to get dressed again before being able to leave the changing cubicle in order to look for more appropriate items of clothing. In addition, as a rule, it is not possible for a user within the changing cubicle to get more information on the items of clothing taken into the cubicle for trying them on, or on similar items of clothing. This makes the comparison among various items of clothing, which are of the same kind or similar to each other, more difficult, the more so since it is not possible for the user in a common changing cubicle to simultaneously try on various items of clothing that are of the same kind or similar and to compare them directly with one another in worn condition.

All in all, the trying on of items of clothing in common changing cubicles becomes thereby very time-consuming and complicated. The possibilities of comparison as well as the possibilities to obtain and exchange information on the items of clothing which are of interest to the user are limited.

Starting from the prior art, it is therefore a problem of the present invention to at least reduce the disadvantages described here. Furthermore, it is the task of the present invention to provide a method for the determination of the body shape of a person, in particular of a dressed person.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a cubicle for trying on one or more items of clothing comprises at least one display displaying an avatar with at least one first item of clothing. Furthermore, the cubicle comprises at least one interaction unit enabling a user of the cubicle to create or modify the avatar and/or to modify the first item of clothing. In certain embodiments, the avatar is an avatar of the user of the cubicle.

The cubicle hence enables the user to try on items of clothing, which may be done by actually trying on an item of clothing in a common changing cubicle. Alternatively or additionally, however, the user may have displayed to her/him an item of clothing in worn condition only and can inspect it without having to put off her/his worn clothes and to put on the items of clothing. By means of the interaction unit, the user is enabled to interactively create the avatar or to modify it. Alternatively or additionally, he may modify the first item of clothing or several items of clothing worn by the avatar, respectively, for example by modifying the size, length, color, material or also of a team wearing its jersey etc. The user may receive an immediate feedback concerning the modifications made.

Such an inventive cubicle may be used both in the private sector and in public. It is also possible to essentially eliminate the need for a lockable cubicle, for example, a cubicle with a lockable door, and to provide, for example, only a support structure which holds the at least one display and the at least one interactive unit, so that the use of the cubicle may be followed by viewers and/or a salesperson or the like. It should already be pointed out here that in certain embodiments of the present invention, the cubicle is adapted such that an interaction of the user and/or the cubicle with mobile phones, mobile apps, social networks, the Internet and the like is possible. What was said here applies also to the further described embodiments of the cubicle according to the invention.

Furthermore, the cubicle according to the certain embodiments of the invention enables the user to examine a large number of different items of clothing in worn condition and to change the avatar's clothes "at the push of a button", without having to leave the cubicle to obtain new items of clothing to take into the cubicle to try them on there. Particularly in a case where an avatar of the user of a cubicle is concerned, the cubicle enables the user to get an idea of her/his appearance when dressed in different items of clothing in the shortest possible time and to check their fit, e.g. the length of the sleeves or also the combination of colors with further items of clothing. This feature is also possible for items of clothing which are not at hand for the moment, so long as these items are stored in a databank, for example, to which the user has access from the cubicle.

Furthermore, in certain embodiments, the cubicle comprises several independent displays on which the user may have an avatar shown to her/him which can wear one or more different items of clothing. This enables a direct comparison between the various items of clothing in worn condition. Additionally, on at least one display surface, further information on the shown avatar and/or the items of clothing worn by the avatar and/or items of clothing similar to those of the worn items of clothing may be shown.

In some embodiments, the cubicle is adapted to detect at least a second item of clothing which is brought into the cubicle by the user. In certain embodiments, the cubicle is adapted to detect the second item of clothing without contact. To this end, a plurality of methods known to the skilled person may be taken into consideration, for example the use of RFID (radio frequency identification), NFC (near field communication) or optical methods that are based on an appropriate image processing.

This feature enables a user to combine the common selection of one or more items of clothing in a store, which, for example, is based on a haptic impression made by the item or items of clothing, respectively, with the cited features of the cubicle. For example, the first item of clothing may be automatically selected and/or modified due to specific properties of the detected second item of clothing, such as, e.g., its size or color or shape.

The detection of the second item of clothing opens further options. Thus, for example, the selection and/or the purchase of an item of clothing may lead to a change of the properties of the avatar in a computer game or the like. Thus, in some embodiments, the endurance capacity, the speed and/or the reaction capacity of the avatar could be influenced if the user purchases an item of clothing. In this manner, the real world of the user may be closely connected with the world of the user's avatar.

The corresponding data collection may be performed by means of a comparison with a databank, e.g. without contact in the cubicle or during a later payment operation. For this purpose, specific user cards with a built-in chip or also RFID or NFC chips in the item of clothing itself may be used. One may also think of using one or more codes that the user has received at any time and which he/she inputs for a comparison with the databank, or which are read out automatically.

In further embodiments, it is furthermore possible that the user enters the cubicle with a computer game, e.g. a newly purchased computer game, whereby the cubicle automatically detects the computer game analogously to the above discussed case of a second item of clothing. Based on this detection, the behavior of the cubicle may be adapted to the computer game, for example, with respect to the creation and/or modification of the avatar or the behavior/appearance of the avatar itself.

In some embodiments, the first and the second item of clothing coincide. This feature allows the user after entering the cubicle to get an impression of what the item of clothing taken into the cubicle by her/him looks like in worn condition or also under real conditions such as, for example, in a sports event.

According to further embodiments of the invention, the avatar is created from pre-stored data. In certain embodiments, the pre-stored data is created from a body shape that is determined according to embodiments of the method—described further below—for determining the body shape of a dressed person.

Thus, the user of the cubicle may store a preferred avatar, for example, an avatar of himself, and use said avatar for displaying it within the cubicle without first needing to adapt a new avatar to the user's wishes. The storage of data, from which the avatar used for displaying is created, also enables the user of the cubicle to choose items of clothing for other persons, for example, for friends and relatives, in case he has the necessary access to the data required for the creation of the avatar of the respective person. This extends the possibilities and the field of application considerably, in particular to the purchase of items of clothing as gifts for other persons. It is particularly comfortable for a user if the body shape, from which the pre-stored data for his avatar is created, may be determined without the need for the user to undress.

With these optional features of the invention, a user may communicate his dressed avatar to other persons and transmit it via e-mail, MMS or via a social network. One or more persons may participate in the selection process, provide evaluations and suggest other sizes, e.g. on the basis of the heatmap described further below.

A "remote" payment function may also be considered. So, for example, parents could agree to an adolescent's choice of an item of clothing or suggest a different size. As soon as an agreement has been reached, the parents pay the chosen items, for example, by means of a payment function on the Internet, whereupon the youth may take the item of clothing home. As a consequence, the transmission of the dressed avatar enables youths to do their shopping alone, while the parents are still able to decide what they want to pay. The discussion and decision may be made discreetly within the cubicle, based on the dressed avatar, maybe with additional data relating to the fit.

In certain embodiments, the interaction unit of the cubicle is adapted to perform a three-dimensional measuring of the user.

Hence, the user does not have to enter a separate unit in order to have an avatar of himself created or to have the avatar adapted to his own body, for example, after gaining or losing weight or after a growth of the user, but this can take place directly within the cubicle according to the invention. This further increases the comfort for the user of the cubicle.

By repeated purchases and use of a current user databank, it may be determined which of the articles bought earlier are most probably not fitting any longer and for which categories of clothes there is a great need (e.g. trousers or jackets). Based thereon, new items of clothing may be suggested. Combinations of "new" items of clothing with "old" ones (which probably are still fitting) may also be suggested.

In certain embodiments, the interaction unit for the creation and/or modification of the avatar is adapted for measuring the user in at least partly dressed condition, and the avatar is created and/or modified by means of an automatic adaption to measurement data of the interaction unit. The interaction unit may be, in particular, adapted to perform one of the methods for determining the body shape of a dressed person, as described further below.

According to further embodiments of the invention, the avatar is displayed in a virtual reality on the at least one display.

For example, the virtual reality may be adapted to the first item of clothing worn by the avatar and/or correspond to a typical environment in which such an item of clothing is normally worn. So, for example, an avatar wearing sports apparel may be represented in a sports stadium, or an avatar wearing an evening dress may be represented in a theater or at a music concert. For outdoor clothes, a landscape with mountains may be represented.

The optional feature of adapting the virtual reality enables the user of the cubicle to better assess the effect of the respective item of clothing in the shown environment. For a particularly realistic effect, it is possible to adapt the sound in the cubicle and other physical properties like the wind, a particular fragrance, the temperature, the air humidity etc.

In certain embodiments, the avatar is further adapted to move simultaneously or time-delayed in case of a movement of the user in the cubicle. The avatar's movements may follow the movements of the user. This gives the user a particularly realistic picture of how the respective item of clothing behaves in worn condition. In this context, also a movement pattern may first be recorded according to which the avatar moves, so as to give the user of the cubicle a particularly realistic impression. This is made use of in combination with the representation of the avatar in a virtual environment. First, a movement pattern of the user may be recorded, for example such as the latter would execute it when playing football, for example, and the avatar may then move according to this pattern on a virtual football field. Furthermore, it may be beneficial if the cubicle enables the user to choose one or more different virtual realities in which the avatar moves according to the recorded movement pattern of the user. This enables the user, without leaving the cubicle and irrespective of the actual environment of the user within the cubicle, to get an idea of how the item of clothing behaves under different movement patterns and in different environments.

In further embodiments, the virtual reality changes dynamically depending on the movement of the user. In some embodiments, the dynamic change may happen simultaneously with the movement of the user. In other embodiments, the dynamic change may also take place time-delayed with the movement of the user, for example in combination with a recorded movement pattern of the user, according to which the avatar moves in the virtual reality. This further contributes to giving the user of the cubicle a realistic picture of the clothing in worn condition, in particular when moving in a typical environment corresponding to the respective item of clothing.

Such a dynamic change may also serve to enable the user to get a virtual look-around view, so that he may cast a look into the virtual reality just like out of a window. The gaze direction of the user may, for example, be tracked and the represented virtual reality may be modified accordingly.

Further embodiments of the dynamic change of the virtual reality are based on capturing the facial expression or gestures of the user. If the latter, for example, expresses by her/his body language, consciously or unconsciously, her/his dislike regarding a specific scene, i.e. if he or she is not interested at all in a specific sport, the represented virtual reality may react to this and carry out modifications by, e.g., showing a scene from a different sport.

According to further embodiments of the invention, the at least one display further displays a heatmap that visualizes a fit of the first item of clothing on the avatar. In some embodiments, this heatmap may represent a pressure distribution on the skin by the item of clothing. However, the representation of other values by the heatmap is also possible, for example, the expansion of the item of clothing or deviations from a predefined ideal fit. A further interaction of the user, for example choosing the preferred fit of the clothes (loose, figure-hugging or the like), with the cubicle may be considered.

The user may, by means of the interaction unit, further adapt one or more items of clothing worn by the avatar by, e.g., choosing a different cut or modifying the size, and receive an immediate feedback in the form of a modified heatmap indicating the effects which the made modifications have on the fit of the items of clothing. This allows a dynamic, interactive adaption of the items of clothing in order to determine an optimal fit. Finally, even a virtual tailoring of the item of clothing is possible by making individual modifications on a dress pattern of the item of clothing. In certain embodiments, the heatmap is shown on the item of clothing worn by the avatar. In further embodiments, the heatmap is displayed in a separate place.

In additional embodiments, the changing cubicle further comprises a communication unit for transmitting a representation of the avatar with the first item of clothing. Thus, the user may send the representation to his e-mail address, for example in order to be able to access it anew for later online purchases, or he may share the representation of the avatar with the first item of clothing in a social network with his friends, e.g., to ask them for their opinion concerning the item of clothing or even to let them participate in the paying in the sense of a "crowd funding".

Finally, the cubicle itself may proactively present suggestions to the user as to which items of clothing match particularly well due to, for example, a successful color combination or other parameters such as the clothing style or the like.

Further embodiments of the present invention are formed by a method for determining a body shape of a dressed person, said method comprising gathering of the spatial coordinates of a plurality of points on the surface of the dressed person. Furthermore, the method comprises determining a plurality of body parameters that at least partially define the body shape to be determined, wherein the body parameters are taken from a stored statistical distribution of body parameters in such a way that the spatial coordinates of the plurality of points are substantially located on a surface of the body shape or outside the body shape.

The method allows the body shape of a person to be determined without a need for him to undress. In particular in combination with the herein described embodiments of a cubicle according to the invention, the method enables a user of a cubicle to virtually try on any kind of clothing—also, e.g., underclothing/underwear—without having to undress.

In embodiments of the method, a reference shell is created from the spatial coordinates of the plurality of points on the surface of the dressed person. In certain embodiments, the method further comprises deforming a surface of a standard reference shell in order to substantially obtain a congruence of the surface with the plurality of gathered spatial coordinates.

The reference shell created in this way specifies a dimension for the maximum spatial expansion of the dressed person's body shape which is to be determined. For example, if the person wears only very little clothes or clothes that are very tight-fitting, the reference shell created in this way represents already a very good approximation to the actual body shape of the dressed person, so that additional, optional process steps, as described below, are not required. The reference shell may also be used for comparison with the databank.

In certain embodiments, the gathering of the spatial coordinates is performed by means of one or more optical scanners, the radiation of which essentially does not penetrate the clothes of a person.

Common methods for determining the body shape of a dressed person are typically based on the use of radiation that may penetrate the clothes of a person to a not inconsiderable extent, such as, e.g., X-radiation. It is, however, a disadvantage of such types of radiation that they may possibly be dangerous for persons and/or may damage objects that are carried by persons. Such devices and methods using such types of rays often need also a special authorization. As a result, radiation may be inappropriate for use in methods and devices which are used, for example, in a cubicle as illustrated above.

The method according to the invention, however, uses a type of radiation that essentially does not penetrate through clothing, thus avoiding at least some of the disadvantages described above. The method uses a statistic approach that does not require a person to undress or a penetration of the clothing by the radiation used for measuring.

In further embodiments of the method according to the invention, there is furthermore an optimization that uses the distances between the spatial coordinates of the plurality of points and of the spatial coordinates of corresponding points on the surface of an assumed body shape. In addition, the optimization may further take into consideration the probability with which the values of the body parameters for the assumed body shape occur in the statistical distribution.

The deviation of the determined body shape from the actual body shape of the dressed person may thus be further decreased. This is relevant particularly if the person wears thick or not very tight-fitting clothing.

In further embodiments, the gathered spatial coordinates of the plurality of points are weighted differently in the determination of the body shape. For example, the spatial coordinates of points which correspond to unclothed areas of the body do not have to be corrected very much in the further process, since the spatial coordinates of such points reflect already substantially the actual body shape in the corresponding unclothed areas of the human body. Such points are therefore weighted differently from the spatial coordinates of points which correspond to clothed areas of persons, for example.

Further embodiments of the present invention relates to a method for creating an avatar for use in combination with a computer game, wherein the avatar for the computer game is created from a body shape which was determined by one of the methods described herein.

Additional embodiments of the invention are formed by an apparatus for carrying out one of the methods according to the invention which were described just now. Here, the method may be implemented in software, hardware or in a combination of software and hardware.

According to certain embodiments of the invention, an avatar is intended for use in a computer game and is created by means of such a method. In some embodiments, the avatar is created for this purpose in a cubicle according to the invention, this cubicle comprising a device for creating an avatar by means of the method described just now. Such a design may be useful, for example, in case the purchase or possession of a corresponding computer game is recorded automatically, e.g. by means of a user identification in the cubicle—maybe via a user-specific scan code or by manually inputting a user-specific code such as, for example, a numerical code—with subsequent databank comparison or the use of the already mentioned techniques using RFID or NFC chips for detecting a packaging of the game or the like.

By now, avatars have made their way into a large number of computer games and/or other virtual realities. Typically, however, predefined avatars are typically used in those applications, or an avatar has to be laboriously adjusted to the expectations and wishes of a player by manual modification of a large number of parameters. The creation of an avatar described here for use in combination with a computer game enables a player to create his personalized avatar interactively and dynamically, without a need for complex manual inputs. At the same time, the player may, for example, equip the avatar with items of clothing that the player may examine beforehand in a shop. Thus, a close interconnection of the real and the virtual world is given which influences the shopping experience and the game experience in a positive manner.

BRIEF DESCRIPTION OF THE DRAWINGS

In the following detailed description, embodiments of the invention are described referring to the following figures:

FIGS. 1a-b are perspective views of a cubicle with at least one display and at least one interactive unit, according to certain embodiments of the present invention.

FIG. 3 is an illustration of a display showing an avatar with at least a first item of clothing, according to certain embodiments of the present invention.

FIG. 4 is an illustration of at least one display that shows an avatar with at least a first item of clothing as well as additional information such as, e.g., a heatmap, according to certain embodiments of the present invention.

FIGS. 6a-b are illustrations of a cubicle with a display showing an avatar with at least a first item of clothing in a virtual reality, wherein the avatar follows the movements of the user of the cubicle, according to certain embodiments of the present invention.

FIG. 7 is an illustration of the fundamental principles of the SCAPE model.

DETAILED DESCRIPTION

Figure 2:
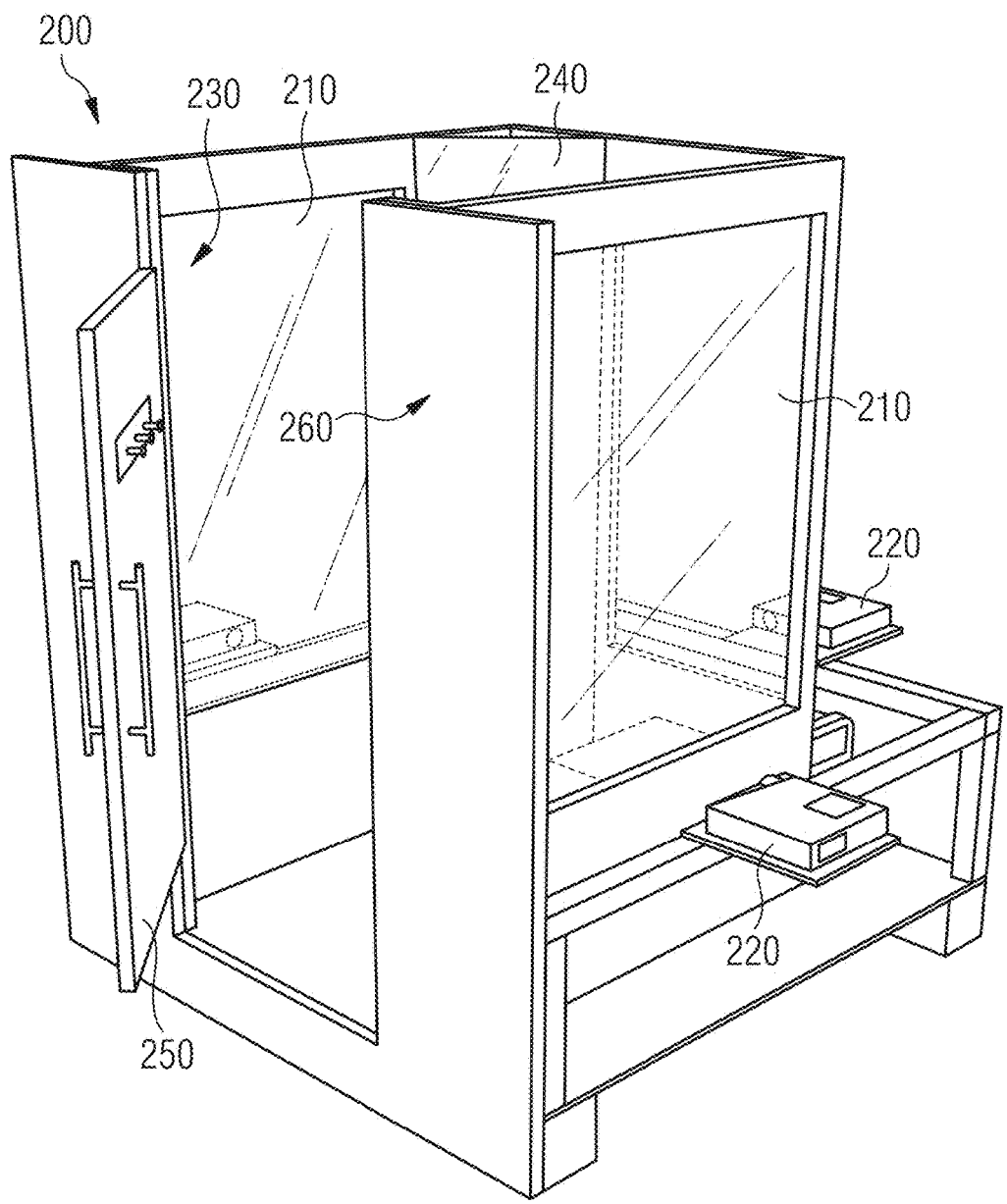
FIG. 2 is a perspective view of a technical implementation of a cubicle, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1a-b show certain embodiments of a cubicle 100. Such a cubicle may, for instance, be arranged like a normal changing cubicle in a shop or a department store. It is, however, also possible to think of an arrangement at other locations, detached from actual sale, or even from the physical presentation of the items of clothing. For example, the cubicle 100 may be arranged in an airport terminal or similar locations, so that waiting travelers may examine new clothing collections in a realistic view on an avatar, or even create an avatar for the first time.

The cubicle 100 comprises three display surfaces 110. In other embodiments, the cubicle 100 comprises a different number of display surfaces 110, e.g. one or two display surfaces. At least one of the three display surfaces 110 serves to show an avatar with at least a first item of clothing. At this point, it is explicitly pointed to the fact that, for the sake of simplicity, even if it is spoken of the first item of clothing in the following, there are also always comprised embodiments in which the avatar wears more than a first item of clothing.

For example, the avatar may wear a first T-shirt, a first pair of trousers and first shoes, etc.

The cubicle 100 comprises a door 120 that allows the creation of a closed private zone. Furthermore, the cubicle 100 may comprise a number of additional elements such as, e.g., a mirror 130 and a seating and/or storage facility 140. One or more mirrors may, however, be integrated also into the display surfaces explained further below. This feature allows a use of the cubicle 100 also in the conventional sense or a combination of the advantages of an interactive cubicle 100 with the advantages of conventional cubicles such as, e.g., the possibility of a haptic feedback.

As can be seen from FIGS. 1a-b, the three displays 110 are attached to an inner frame or stand 150 to which, for example, the mirror 130 may also be fixed. Together with the door 130, this frame 150 forms a closed interior space when the door is closed, in which the user of the cubicle may stay and use the cubicle (of course, the cubicle may also be used with an open door). As can be seen from FIG. 1a, the cubicle 100 optionally comprises a further outer frame 160. This frame surrounds the inner frame 150, with one or more spaces being present between the outer frame 160 and the inner frame 150 within which, for instance, the technology and infrastructure such as, for example, computers, projectors, air conditioning units, lighting units, power supply etc. may be arranged and hidden from the eyes of a user. This protects, for instance, against unauthorized access to this technology. For getting access to this technology, the outer frame 160 may comprise a lockable door or opening (not shown), which may only be opened by employees and may remain hidden from the eyes of users of the cubicle 100.

The cubicle 100 further comprises an interactive unit (not shown) that enables a user to create or modify the avatar and/or to modify the first item of clothing. For this purpose, at least a partial region of at least one of the three displays 110 may be equipped with a touch-sensitive surface serving as interactive unit. Alternatively, or additionally, further interactive units such as, for example, a keyboard, a touchpad or a device for voice and gesture control may be available in the cubicle 100. In further embodiments described herein, the interactive unit may also serve to get additional information on the avatar and the item of clothing, call up a heatmap, select a virtual reality in which the avatar is shown, and to generally access or control the functions provided by the cubicle 100. In further embodiments, the behavior of the cubicle 100 may also be further influenced or controlled, respectively, from outside the cubicle, for example, by a salesman. Another option would be a control by an app on a smartphone or similar or by another person being outside the cubicle or even farther away.

FIG. 2 shows a possible technical arrangement 200 of the cubicle 100 shown in FIGS. 1a-b. The cubicle 200 comprises three display areas 210 which are configured here as rear-projection PLEXIGLAS plates. These are each irradiated from behind by one or more short-distance projectors 220. At least one projector 220 is a FullHD projector 220. Such a FullHD projector 220 may be used, for example, to represent high-resolution product information. The advantage of a projector compared to other display devices lies in the high flexibility of the presentable data formats.

In other embodiments, the display surfaces 210 are large-area LED or LCD displays, particularly preferable OLED displays.

At least one of the display surfaces 210 may be configured as a touch-sensitive display surface serving as interactive unit for controlling the behavior of the cubicle 200 and for modifying the displayed avatar and/or the first item of clothing. For this purpose, for example, a touch-sensitive foil 230, e.g. a capacitive touch-sensitive foil 230, may be applied on one of the display surfaces 210. In further embodiments, one of the display surfaces 210 itself comprises already a touch-sensitive surface such as, e.g., a touch screen. Alternatively, also cameras may be provided for recording the movements of the user by means of which the cubicle is to be controlled.

The projectors 220 or the displays used for displaying, respectively, are connected to the infrastructure (not shown) required for representing the virtual contents (avatar with item of clothing, virtual realities, additional information, menus etc.) and are supplied with the necessary data by said infrastructure. Furthermore, the interactive unit, for example the touch-sensitive display surface 230, is also connected to this infrastructure in order to influence the behavior and the displayed contents.

In some embodiments (not shown), the cubicle further comprises technical installations by means of which the user may be given a haptic experience of a virtually selected item of clothing. This may be achieved, for example, by one or more regions of a display which comprise additional electrodes that expose a touching finger to a voltage. By means of alternating voltages of different frequencies, various textures of a virtual item of clothing may be presented thereby in a haptic simulation. Alternatively or additionally, a haptic impression may also be obtained by means of a specific temperature distribution on the display which is created by corresponding small heating elements.

The cubicle shown in FIG. 2 further comprises, as already discussed above, a mirror 240 as well as a door 250 which may be locked so as to create a closed private area.

The cubicle 200 further comprises at least one device 260 which allows detecting at least a second item of clothing that is taken into the cubicle 200 by the user. Here, too, it is explicitly emphasized that while it is always referred to the second item of clothing in the following, there are always comprised also embodiments in which the user takes more than one second item of clothing into the cubicle, for example, a second T-shirt, a second pair of trousers and a second pair of shoes. The device 260 may be able to capture the second item of clothing (or the second items of clothing, respectively, see above) without physical contact.

For example, the device 260 may be a radio frequency ID antenna which is able to contactless read out information relating to the second item of clothing, said information being stored on a chip attached to the second item of clothing. This enables the cubicle 200 to become aware of second items of clothing taken into the cubicle 200 by a user when entering the cubicle 200. The cubicle 200 may then greet the user for example by displaying a standard avatar that wears the items of clothing taken into the cubicle by the user.

If the user takes more second items of clothing into the cubicle 200 and if the avatar is not able to present the items of clothing as being worn by an avatar at the same time, the cubicle 200 may react thereto in different ways. For example, the cubicle 200 may be configured such that in case of second items of clothing worn on top of each other—for example, a T-shirt and a sweater or underpants and trousers—it shows an avatar which always presents the item of clothing worn outermost (in the above case, the sweater and the trousers). Alternatively, the cubicle may be configured such that is shows several avatars that each wear different "layers" of clothing (in the above case, one avatar could, for example, wear the underpants and the T-shirt, and a second avatar the trousers and the sweater). All avatars could be shown on one single display surface 210, or else—if available—at least partially on different display surfaces 210. If the user takes several similar items of clothing—for example, several pairs of trousers—into the cubicle 200, the cubicle may, as described above, be configured such as to show several avatars each wearing one of the similar items of clothing. In a further configuration, the cubicle shows only one avatar wearing the item of clothing captured first or last, etc.

Conceivable is also the representation of the heatmaps explained above on an avatar, if several items of clothing are worn on top of each other. This could suggest to the user in an intuitive manner whether under a specific item of clothing, e.g. a sweater, it is possible to wear one or more further items of clothing. The information required for this purpose concerning the respective items of clothing may be either called up from a databank, or it is contactlessly forwarded to the cubicle by means of an appropriate chip located on or in the item of clothing.

The skilled person is aware that the cases described here serve only as examples and that the cubicle 200 may be configured in the most varied ways. The cubicle may, on the one hand, be preset, for example when entering the cubicle for the first time, or the user of the cubicle 200 may determine the behavior of the cubicle 200 themselves. A combination of preset basic settings which the user may further adapt to her/his special wishes is also possible. In this case, it may be beneficial if the user has the option to store the settings he/she made, so that he/she will be able to retrieve them at a later time.

For example, the settings may be stored in a personalized databank or may be forwarded via a communications unit and read-in again. The settings may be reset to preset basic settings when leaving the cubicle 200, so that a new user finds the cubicle 200 in its basic configuration and, where appropriate, may make or load his personalized settings, as explained just now. Optionally, a user is asked when leaving the cubicle 200 whether the settings shall be reset, as the user might possibly leave the cubicle 200 only for a short time and then continue to use the cubicle 200, so that a reset of the settings would not make sense. In further embodiments, the settings are automatically reset after a certain period of time once the user has left the cubicle 200.

Express reference is made herein to the fact that the above explanations do not only concern the behavior of the cubicle 200 with respect to the display of second items of clothing taken into the cubicle by the user, but apply also to any type of settings that relate to the behavior of the cubicle 200 and which may be adapted and modified by the user.

FIG. 3 shows an example 300 of one of the display surfaces 110, 210 shown in FIGS. 1*a-b* during use of the cubicle. An avatar 310 is shown wearing at least a first item of clothing. In the example shown here, the avatar 310 wears a first T-shirt 320, a first pair of trousers 330 and a first pair of shoes 340.

In some embodiments, the avatar 310 is an avatar 310 of the user of the cubicle. This enables the user to get a realistic idea of her/his appearance in the selected item of clothing 320, 330, 340. In further embodiments, the avatar 310 is a preset standard avatar. Alternatively, the avatar 310 may also be created from pre-stored data. The data required for this may, for example, be taken along by a user of the cubicle, be stored in a databank or else be retrievable over other communication facilities.

It is particularly comfortable for the user if such data may be created from a body shape of her/his body for whose determining the user does not have to take off her/his clothes. Such a method for determining the body shape of a dressed person from which the pre-stored data may be created for generating an avatar also constitutes embodiments of the present invention and will be described in detail further below.

The communication unit mentioned above or a further similar installation, respectively, allow the user, in further embodiments, to store, forward and/or share with his friends, in a social network, a representation of the displayed avatar wearing the first item of clothing, for example in order to know their opinion on the respective item of clothing.

The use of pre-stored data for the creation of the displayed avatar allows the user of a cubicle, in particular, not only to have her/his own avatar displayed, but also avatars of her/his friends or acquaintances, to the extent that they permit the user to use their data. Hence, for example, a user who wants to purchase an item of clothing as a gift for an acquaintance or on behalf of the latter may control the fit and the appearance of the respective item of clothing in a virtual way without requiring the presence of said acquaintance.

The display surface 300 further shows a plurality of menu points 350 that enable the user to modify the avatar 310 and/or the first item of clothing 320, 330, 340. Furthermore, the display surface 300 shows a symbol 360 for calling up additional information, for example with respect to the items of clothing 320, 330, 340, or else for using the cubicle. It may be beneficial if the display surface 300 comprises a touch-sensitive surface which allows the user to activate the individual menu points 352, 355, 358 or the symbol for calling up further information 360 by direct touch.

FIG. 4 shows a further example 400 of one or more of the display surfaces 110, 210 shown in FIGS. 1*a-b* during use of the cubicle. Here, the whole content may be shown on one display surface or else—if available—distributed over several display surfaces. Thus, a greater clarity of the shown information is obtained.

First of all, an avatar 410 wearing a first item of clothing 420 is shown. The avatar 410 is, for example, a preset standard avatar or an avatar of the user of the cubicle, said avatar having been created from pre-stored data or by other means (for example, by means of a device for the creation/modification of an avatar and which is available in the cubicle, see below). Furthermore, a number of menu points 432, 435 are shown by which, for example, the avatar 410 and/or the first item of clothing 420 may be modified or by which a main menu may be called up. These menu points may be activated by touching the surface of the display(s). Displayed is furthermore a number of additional items of clothing 440 as well as further information relating to these items of clothing—e.g. user ratings, price, etc.—which are similar to the first item of clothing 410, for example, or which are particularly suited for being worn together with the latter.

Such additional information may also be displayed for the first item of clothing 420 currently worn by the avatar 410. In the embodiments shown in FIG. 4, for example, user ratings 450 concerning the first item of clothing 420 as well as information 460 (e.g. the accuracy of fit and the length) of the first item of clothing 420 on the avatar 410 are described.

The fit of the first item of clothing 420 on the avatar 410 may be furthermore displayed to the user in a visually prepared manner. For example, a pressure distribution exerted on the avatar 410 by the first item of clothing 420 may be visualized in the form of one or more heatmaps. It may be beneficial for the user if several of such representations 472, 474, 476, 478 are shown at the same time, with each representation 472, 474, 476, 478 showing such a heatmap for the first item of clothing 420 in a different clothes size—e.g. XS, S, M and L. This enables the user to get a direct visual conception of the accuracy of fit of the first item of clothing 420 in the various different sizes and to choose the appropriate size without having to try on all these individual items of clothing. This increases the comfort and the pleasure of the user when choosing items of clothing. In certain embodiments, which are not shown, it is furthermore possible to have such heatmaps displayed also for further items of clothing, for example for one or more of the items of clothing 440, in one or more sizes. This enables the user not only to find the appropriate size for a specific item of clothing, but to also compare, at the same time, the fit of different models, types, product line etc.

The preparation of a heatmap may be made by comparing the 3D-shape of the item of clothing—by taking into account a certain expansion, if necessary—with the 3D-shape of the avatar. However, a heatmap which is based on pressure distribution is only one option. There is also the possibility of visualization of other parameters, such as, e.g., the expansion of the material of the item of clothing or deviations from a perfect fit, etc.

Figure 5A:
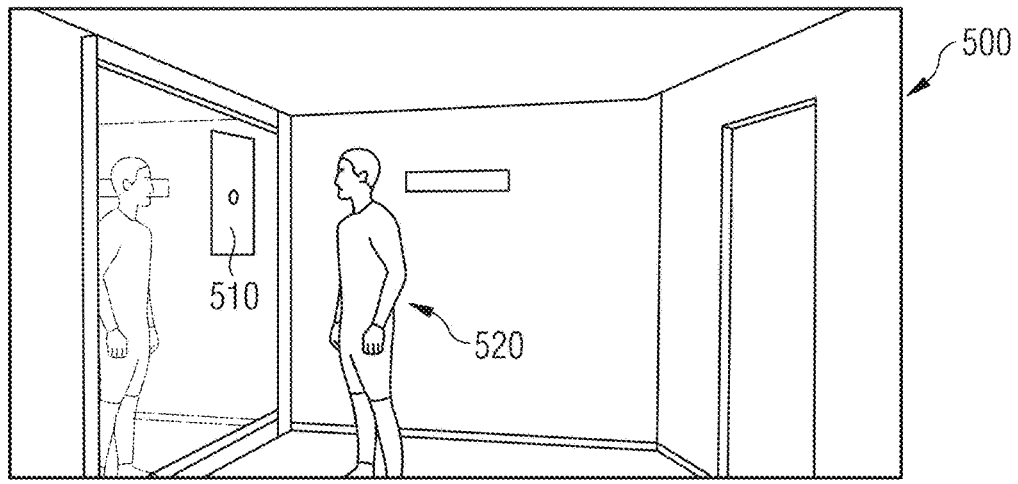
FIGS. 5a-c are illustrations of a cubicle with a display and a device for creating an avatar of the user of the cubicle, according to certain embodiments of the present invention.
Figure 5B:
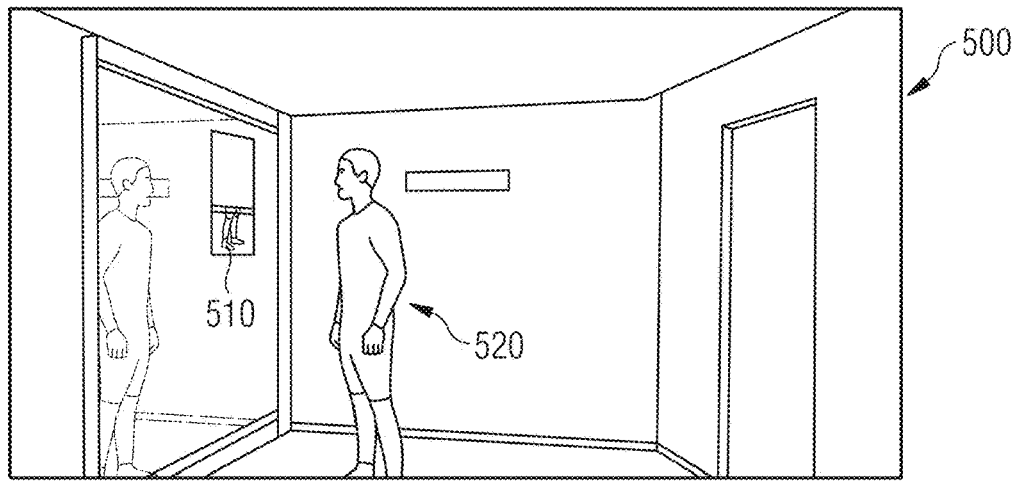
Figure 5C:
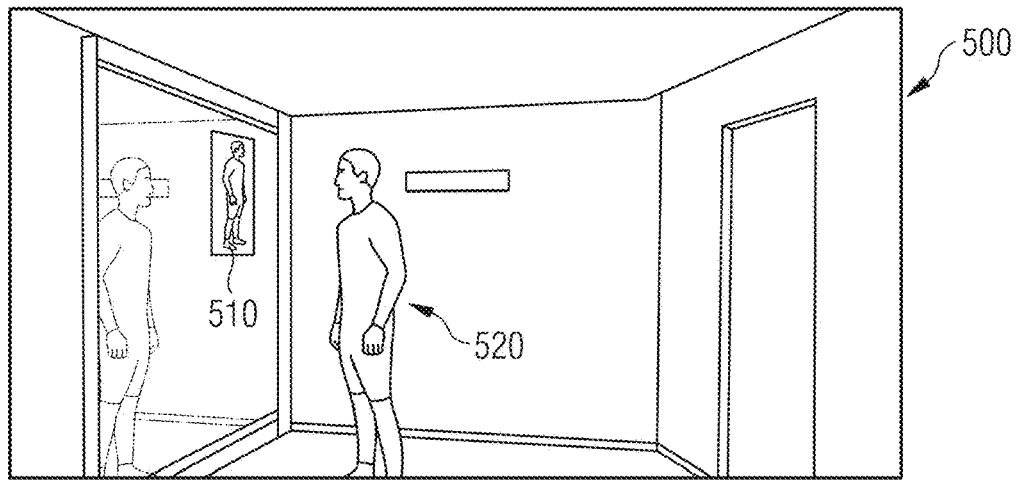

FIGS. 5*a*-*c* show embodiments of a cubicle 500 according to the invention which comprises a display surface 510 on which, inter alia, an avatar with a first item of clothing may be displayed. In certain embodiments, the display surface 510 comprises a touch-sensitive surface which allows the user 520 to interact with the cubicle in order to, for example, create or modify the displayed avatar and/or the first item of clothing. Additionally or alternatively, the cubicle 500 may comprise further interactive units (not shown) like, for example, a keyboard, a touchpad, a device for voice control, etc. In some situations, it may not be desired that the user 520 touches the display surface 510 directly, since this may lead to a contamination of the surface.

The cubicle 500 further comprises a device (not shown) for creating and/or modifying the displayed avatar. Such a device may be used, for instance, to create an avatar of the user 520 when using for the first time such a cubicle 500 according to the invention, or to adapt an avatar of the user 520 created from pre-stored data to the body proportions of said user. In embodiments, this device is located directly behind the display surface 510. In further embodiments, such a device comprises various sub-devices which are, for example, mounted in one or more corners of the cubicle 500.

Such a device may comprise one or more sub-devices for performing three-dimensional measurements of the user 520. For the three-dimensional measurements, it may be beneficial to use a radiation which does not substantially penetrate through the clothes of the user 520, as, e.g., infrared radiation.

In comparison with X-rays, for example, IR radiation is, in general, not dangerous for the user 520 of the cubicle 500 and for objects which are present in the cubicle 500. A method using such radiation and by means of which a true image of the body shape (i.e. the shape of the body in undressed state!) of a person may nevertheless be obtained without said person having to undress also constitutes, as already mentioned, a part of the present invention and will be described in detail further below.

The mentioned method thus allows that in some embodiments of the cubicle 500, the device for creating/modifying the avatar is adapted to take measurements of the user 520 in an at least partially dressed condition. Here, the avatar is, for example, created and/or modified by an automatic adaptation to measurement data of the device. The already mentioned method according to the certain embodiments of the invention may be used for this. In further embodiments, the creation and/or modification are performed partially automatically, i.e. the user 520 is given the opportunity to manually influence the creation and/or modification of the avatar.

FIGS. 5*a*-*c* show the cubicle 500 according to the invention schematically during different stages of the creation of an avatar of the user 520. In FIG. 5*a*, the cubicle 500 is shown directly after the entering of the user 520. For example, a greeting screen is shown on the display surface 510 and asks the user whether he/she wishes to continue a session still going on, whether he/she wishes to start a new session and wants to set the settings back to preset standard values and so forth.

If the user 520 selects the start of a new session, he/she is asked, for example, whether he wishes to use a standard avatar, whether he/she wishes to create an avatar from pre-stored data as described above or whether he/she wishes to be measured for creating/modifying her/his avatar. An automatic user identification via a card of the user provided with a radio chip, an automatic registration of a smartphone of the user, a device for registering a finger print of the user or similar techniques are also conceivable.

FIG. 5*b* schematically shows the cubicle 500 during the three-dimensional measuring of the user 520.

FIG. 5*c* finally shows the cubicle 500 upon completion of the measuring and creating of the avatar of the user 520. The display surface 510 now shows the avatar of the user 520. In the embodiments shown here, the shown avatar wears first items of clothing which correspond to the second items of clothing worn by the user 520. For this, as explained above, the second items of clothing worn by the user, for example, are recorded without physical contact when entering the cubicle.

FIGS. 6*a*-*b* show further embodiments 600 of a cubicle according to the invention with a display surface 610 showing an avatar 620 wearing a first item of clothing. In the embodiments shown here, the avatar is an avatar of the user 630 and wears the same clothing as the latter. Furthermore, in the embodiments depicted here, the avatar 620 is shown in a virtual reality 640, in this case in a football stadium. In the embodiments shown here, the wall 650 of the cubicle is further adapted to the virtual reality 640 shown on the display surface 610, i.e. the wall is configured such that it goes smoothly over into the virtual reality 640. Such embodiments of a cubicle 600 may be used, for example, in sales rooms where specific items of clothing, in the present case, for example, football wear, are sold. In further embodiments, the wall 650 is neutrally configured, and the represented virtual reality 640 may be selected and/or adapted by the user of the cubicle 630. Alternatively, the represented virtual reality may also be selected automatically. The cubicle 600 may, for example, record items of clothing taken into the cubicle by the user 630 and adapt the virtual reality accordingly. Or else, the cubicle adapts the virtual reality to the first item of clothing worn by the avatar 620 and which the user 630 had chosen or modified via an interactive unit (not shown) of the cubicle 600.

In some embodiments, the avatar 620 is further designed to move when the user 630 moves within the cubicle 600. This may substantially happen simultaneously or time-delayed. The avatar 620 may imitate the movements of the user 630 or follows them, respectively, or it moves like in a preset scene corresponding more or less to the user's movement. As can be seen from FIGS. 6*a*-*b*, the avatar 620 shown here, for example, follows with his upper part of the body the turn of the upper part of the user's 630 body. In order to record the movements of the user 630, here, for example, the same devices are used that are used for a three-dimensional measuring of the user when creating and/or modifying his avatar, as described above. In further embodiments, additional devices known for such purposes from the prior art are used for recording the movements of the user 630.

It may be beneficial if the virtual reality 640 changes dynamically depending on the movement of the user 630. For example, the virtual reality 640 may change at a turn of the head of the user 630 of the cubicle 600 and so allow the user 630 a kind of "panoramic view" in the virtual reality, as already explained in detail above.

Further embodiments of the present invention relates, as already mentioned several times, to a method for determining the body shape of a dressed person. By the term body shape, the shape of the body of a human in undressed condition is to be understood here. Such a method may be used in some embodiments of the cubicle according to the invention, since the method enables to create or adapt, respectively, the avatar of a user of such a cubicle without the user having to undress for this. The user may receive instructions for the creation or modification of the avatar within the cubicle itself, for example, on one of the display devices and/or by means of audio signals which explain to her/him how he/she has to behave for carrying out the method.

The method is based on a statistic model of body shapes existing in real life. An example of such a statistic model is the SCAPE model, the principles of which are explained in FIG. 7. The model is based on a parameterization of body shapes parameterizing a given body shape substantially by means of shape parameters $\{c_i\}_{i=1, \ldots, m}$, cf. 710, and orientation parameters $\{\Phi_j\}_{j=1, \ldots, n}$, cf. 720.

For this purpose, the body is divided into a number of partial regions, cf. 720. The shape parameters describe overall properties of the body such as its thickness, size, the muscle mass, etc., while the orientation parameters describe the orientations between two respective adjacent partial regions, i.e., for example, the angle between the upper arm and the forearm. The parameters are defined such that any body shape existing in real life substantially may be parameterized and reconstructed by them, cf. 730.

The SCAPE model is based on a plurality of measurements of a test person in a plurality of real body poses. For each of the poses measured, the shape and orientation parameters $\{c_i\}$ and $\{\Phi_j\}$ describing said poses were determined. In addition, shape parameters were determined for a plurality of test persons in order to maintain the variance of the body shapes. From the entirety of the parameters thereby obtained, for each shape and orientation parameter a probability distribution was determined which indicates the probability that a specific value of the respective parameter occurs in real poses of humans. All these probability distributions could then be summarized in the framework of a single m+n-dimensional probability distribution. If necessary, a principal component analysis (PCA) is carried out to reduce the number of parameters and eliminate correlated parameters at least in part.

With the method according to the invention for determining the body shape of a dressed person, first the spatial coordinates of a plurality of points are gathered on the surface of the dressed person, i.e. on the surface of the clothes in clothed regions, or on the skin of the person in unclothed regions, respectively. As already mentioned above, one or more scanners may be used for this purpose, said scanners using an IR radiation that does not substantially penetrate through the clothing of a person. It is a special advantage of the method according to the invention that there is particularly no need for using rays penetrating through the clothing of a person to a substantial extent in order to determine her/his body shape, since such types of rays like, e.g., X-rays, may often be harmful to humans.

The spatial coordinates captured in this way, or the respective points in space defined by these spatial coordinates, substantially form a "reference frame" within which the sought body shape of the person has to lie. "Substantially" means in this context in particular "except for measurement errors", as such measurement errors are present in each measurement. The method according to the invention may be based on the following consideration: For determining the sought body shape, all or at least a part of the above-mentioned shape and orientation parameters $\{c_i\}$ and $\{\Phi_j\}$ are determined for the sought body shape in such a way that the captured spatial coordinates of the plurality of points are substantially located on a surface or outside the sought body shape defined by the shape and orientation parameters.

In order to facilitate a comparison between the "reference frame" set by the captured spatial coordinates and the body shape which is to be determined, for example, first a reference shell may be created from the spatial coordinates of the plurality of points on the surface of the dressed person. In the simplest case, this may be done by considering three adjacent space points each as defining a triangular area. The reference shell then consists of the totality of all triangular areas, i.e. the mesh of triangles, which is spanned by the recorded space points.

In a further optional step, the surface of the reference shell may further be deformed in order to substantially reach a match of the surface with the plurality of the recorded spatial coordinates. In some embodiments, such a verification of match is carried out only for a partial amount of all recorded spatial coordinates in order to save computing time. Such a match may, for instance, be determined quantitatively in the sense of a least-squares-method. Thereby, the distance between the recorded spatial coordinates of a point of the surface of the dressed person to a corresponding point on the reference shell (for example, the point on the reference shell that is closest the respective space point) is squared, and the sum of these values is added up for all considered points. The surface of the reference shell then is substantially congruent with the (considered) recorded space points when this sum is minimal. Other quantitative measures for the match mentioned here, as, e.g., a Procrustes analysis, are also conceivable.

In the event that the measured person is actually undressed or is wearing only very thin and/or tight-fitting clothes, the so created reference shell already constitutes a good approximation to the searched body shape. An additional data comparison may be helpful therefor.

In other cases, particularly in cases of thick or not tight-fitting clothes, the so created reference shell, as already mentioned, constitutes only a maximum spatial dimension within which the searched body shape has to lie. For a better determination of the actual body shape, further method steps are necessary.

In some embodiments, the reference shell created by means of the just described method steps is first converted into a corresponding SCAPE body shape which is parameterized by shape and orientation parameters $\{c_i\}$ and $\{\Phi_j\}$. In this context, it is important to note that between the possible reference shells and the possible SCAPE body shapes, there is a 1-to-1 correspondence, as both have the same topology. For converting the determined reference shell into a SCAPE body shape, first, the orientation parameters $\{\Phi_j\}$ of the SCAPE body shape corresponding to the reference shell are determined by means of a Procrustes analysis, and the SCAPE body shape determined thereby is then brought in line with the shape of the reference shell by deformation, i.e. by adaption of the shape parameter $\{c_i\}$. The SCAPE body shape created in this manner, which in the following is referred to as SCAPE reference shape, now forms the "reference frame" within which the sought body shape substantially has to lie; unclothed zones of the measured person may also lie on this reference frame. Thus, it is ensured, for example, that for the regions corresponding to the hands, the feet or the head, an exact match between the reference frame and the spatial coordinates determined for these regions is given.

Following this, the shape and orientation parameters $\{c_i\}$ and $\{\Phi_j\}$ are optimized, starting from a standard SCAPE shape, for determining the sought body shape of the measured dressed person. Typically, first the orientation parameters and then the shape parameters are adapted. Hereby, it has to be noted that the sought SCAPE body shape, as already mentioned, substantially has to lie within the SCAPE reference shape.

In certain embodiments, the optimization of the SCAPE parameters is done by taking into consideration the distances between the captured spatial coordinates of the plurality of points on the surface of the dressed person (which now correspond to points on the SCAPE reference shape) from corresponding points on the surface of the assumed body shape (which now correspond to points on the body shape which is defined by the SCAPE parameters that are to be optimized, in the following referred to as assumed SCAPE shape). For example, one could try to minimize these distances. This alone, however, would substantially lead to a reproduction of the SCAPE reference shape.

It has, indeed, proven to be beneficial to first adapt, in the best possible way, the pose of the assumed SCAPE shape to the pose of the SCAPE reference shape. For this purpose, the surfaces of the SCAPE reference shape and of the assumed SCAPE shape may be approximated by triangular meshes, and the distances between the corresponding vertices of the triangular mesh of the SCAPE reference shape and the assumed SCAPE shape are used as distances used for optimization. The coordinates of the vertices of the SCAPE reference shape and the assumed SCAPE shape are referred to as $v_k$ and $\hat{v}_k$.

A step of the method according to certain embodiments of the invention now comprises trying to minimize not only the distance between the vertices when optimizing the pose, but to optimize at the same time the likelihood with which the orientation parameters $\{\Phi_j\}$, which define the pose of the assumed SCAPE shape and which are combined in the following into the vector p, appear in the above-mentioned (empirically determined) m+n-dimensional probability distribution. A simultaneous optimization may be made for example by means of a Levenberg-Marquardt algorithm which uses the following non-linear energy function:

$$E(p) = \sum_k (v_k - \hat{v}_k)^2 + w_p \sum_l \left(\frac{p'_l}{\sigma_l}\right)^2$$

wherein p' corresponds to the vector p projected into a principal component analysis (PCA) basis, $w_p$ is a weighting factor which, for example, may assume the value 0.1, and $\sigma_l$ is the variance of the probability distribution of the respective orientation parameters in the PCA basis.

After the pose has been optimized by the method described here, in some embodiments of the method, furthermore, an optimization of the shape takes place, whereby, on the one hand, it has to be ensured that the assumed shape lies substantially within the SCAPE reference shape, and, on the other hand, here too, the probabilities have to be taken into account with which the selected values of the body parameters, in particular the shape parameters $\{c_i\}$, appear in the statistical distribution. For this purpose, again a Levenberg-Marquardt algorithm with the following non-linear energy function is used:

$$E(c) = \sum_k \alpha_k (v_k - \hat{v}_k)^2 + w_p \sum_i \left(\frac{c_i}{\sigma_i}\right)^2$$

wherein, in analogy to the above, $\sigma_i$ is the variance of the probability distribution of the respective shape parameter and $w_s$ is a weighting parameter which, for example, may assume the value 0.5. The weighting parameters $\alpha_k$ for example, set equal to 1 for vertices of the assumed SCAPE shape which lie within the SCAPE reference shape, and equal to 4 for such vertices of the assumed SCAPE shape which lie outside the SCAPE reference shape. Thus, such vertices that lie outside are "punished" more severely and thereby pushed into the SCAPE reference shape.

In further embodiments, the latter, however, applies only to such vertices which correspond to actually dressed points on the surface of the measured person. For such vertices, which correspond to undressed points, for example, points in the face, on the hands, etc., the weighting parameters $\alpha_k$ continue to be equated with 1, even if the corresponding vertex of the assumed SCAPE shape lies outside he SCAPE reference shape, since such points do not perforce have to lie within the reference shape but may also lie "upon" it.

However, it has to be noted that the here presented fundamental process steps of the method according to the invention are not tied to the SCAPE model discussed here, but may be used also in connection with other statistical models for body shapes, which, for example, choose a different parameterization or determine the probability distributions of the body parameters in a different manner, for example based on theoretical considerations. Such methods, too, belong to the present invention.

Furthermore, it has to be emphasized that the elucidated method may be carried out in the above explained cubicle. However, an execution at other locations is also conceivable, since merely a sufficient number of devices have to be provided, so that the required spatial coordinates of the dressed user may be recorded. Such devices, for example the explained IR scanners, may be installed without great effort at almost any place, for example, also in public spaces like a pedestrian area, e.g. in front of the shop-window of a store.

In certain embodiments, the body shape determined by means of the explained method for creating an avatar is embellished at critical points. Such modifications concern, for example, about 5% of the entire shape. The real data of the body shape, however, are maintained for other applications. For example, the above explained heatmaps may be established on the basis of real data, however, without calling the user's attention to "shapeless" (deviating from the general ideal of beauty) body regions.

According to further embodiments, the above explained avatar could be combined with data concerning fitness and/or data concerning a training of the user. For example, the avatar may indicate changes in the body shape resulting from training and which have already occurred or may occur in the future, for example, a stronger musculature. Conversely, the user may also receive suggestions or instructions for an effective training and/or healthier nutrition. The direct optical feedback by visualization with the avatar thus strengthens the training motivation of the user.

In this context, also a data takeover to and from electronic training systems may be provided. Such an electronic training system is, for example, a data-based or Internet-based system which processes training-related data of the user. In doing so, the data may be manually updated to the most recent level and/or the data are automatically recorded by sensors and/or a system which is able to determine the position of the user, like, e.g. a GPS system.

Further embodiments of the invention are provided by a device for carrying out one of the just described methods according to the invention, whereby the method may be implemented in software, hardware or a combination of software and hardware.

Further embodiments of the invention are further provided by a method for creating an avatar to be used in combination with a computer game, wherein the avatar is created from a body shape which was determined by one of the above described embodiments of the method according to the invention, as well as an avatar to be used in combination with a computer game, said avatar having been created by means of such a method. The recording of the spatial coordinates of a plurality of points on the surface of a dressed person, which belongs to the method, takes place in certain embodiments of the cubicle according to the invention which furthermore enables the user to store her/his avatar for further use or to forward it directly via a communication system, for example the Internet.

In the following, further examples are described to facilitate the understanding of the invention:

1. Cubicle (100; 200; 500; 600) for trying on one or more items of clothing, comprising:
   a. at least one display (110; 210; 300; 400; 510; 610) displaying an avatar (310; 410; 620) with at least one first item of clothing (320; 330; 340; 420); and
   b. at least one interaction unit (210) enabling a user (520; 630) of the cubicle to create or modify the avatar (310; 410; 620) and/or to modify the first item of clothing (320; 330; 340; 420).

2. Cubicle (100; 200; 500; 600) according to example 1, wherein the avatar (310; 410; 620) is an avatar of the user (520; 630) of the cubicle.

3. Cubicle (100; 200; 500; 600) according to example 1 or 2, wherein the cubicle is further adapted to detect at least a second item of clothing which is brought into the cubicle by the user (520; 630).

4. Cubicle (100; 200; 500; 600) according to example 3, wherein the cubicle is adapted to detect the second item of clothing without contact.

5. Cubicle (100; 200; 500; 600) according to example 3 or 4, wherein the first (320; 330; 340; 420) and the second items of clothing coincide.

6. Cubicle (100; 200; 500; 600) according to one or the preceding examples, wherein the avatar (310; 410; 620) is created from pre-stored data.

7. Cubicle (100; 200; 500; 600) according to example 6, wherein the pre-stored data was created from a body shape which was determined according to one of examples 16-22.

8. Cubicle (100; 200; 500; 600) according to example 7, wherein the interaction unit (210) for creating and/or modifying the avatar (310; 410; 620) is adapted to perform a three-dimensional measuring of the user (520; 630).

9. Cubicle (100; 200; 500; 600) according to example 8, wherein the interaction unit (210) is adapted for measuring the user (520; 630) in an at least partly dressed state and wherein the avatar (310; 410; 620) is created and/or modified by an automatic adaption to measurement data of the interaction unit.

10. Cubicle (100; 200; 500; 600) according to example 9, wherein the interaction unit (210) for creating and/or modifying the avatar (310; 410; 620) is adapted to perform a method according to one of examples 16-22.

11. Cubicle (100; 200; 500; 600) according to one of the preceding examples, wherein the avatar (620) is displayed on the at least one display (110; 210; 510; 610) in a virtual reality (640).

12. Cubicle (100; 200; 500; 600) according to one of the preceding examples, wherein the avatar (310; 410; 620) is adapted to move simultaneously or time-delayed in case of a movement of the user (520; 630) in the cubicle (100; 200; 500; 600).

13. Cubicle (100; 200; 500; 600) according to example 12 in combination with example 11, wherein the virtual reality (640) changes dynamically depending on the movement of the user (520; 630).

14. Cubicle (100; 200; 500; 600) according to one of the preceding examples, wherein the display (400) further displays a heatmap (472; 474; 476; 478) which visualizes a fit of the first item of clothing (420) on the avatar (410).

15. Cubicle (100; 200; 500; 600) according to one of the preceding examples, wherein the cubicle further comprises a communication unit for transmitting a representation of the avatar (310; 410; 620) with the first item of clothing (320; 330; 340; 420).

16. Method for determining a body shape of a dressed person, comprising:
    a. gathering the spatial coordinates of a plurality of points on the surface of the dressed person; and
    b. determining a plurality of body parameters which at least partly define the body shape to be determined,
    c. wherein the body parameters are taken from a stored statistical distribution of body parameters such that the spatial coordinates of the plurality of points are substantially located on a surface of the body shape or outside the body shape.

17. Method according to example 16, wherein a reference shell is created from the spatial coordinates of the plurality of points on the surface of the dressed person.

18. Method according to example 17, further comprising the step of deforming a surface of the reference shell so as to substantially obtain a congruence of the surface with the plurality of the gathered spatial coordinates.

19. Method according to one of examples 16-18, wherein the gathering of the spatial coordinates is performed by means of one or more optical scanners, the radiation of which does essentially not penetrate through the clothes of the person.

20. Method according to one of examples 16-19, wherein an optimization is performed in step c. which uses the distances between the spatial coordinates of the plurality of the points and spatial coordinates of corresponding points on the surface of an assumed body shape.

21. Method according to example 20, wherein the optimization further takes into account the probability with which the values of the body parameters for the assumed body shape appear in the statistical distribution.

22. Method according to one of examples 16-21, wherein the gathered spatial coordinates of the plurality of points are weighted differently in step c.

23. Method for creating an avatar (310; 410; 620) for use in combination with a computer game, wherein the avatar (310; 410; 620) is created from a body shape which was determined by a method according to one of examples 16-22.

24. Method according to one of examples 16-22, wherein the determined body shape is used together with a training system.

25. Device for carrying out a method according to one of examples 16-24.

26. Avatar (310; 410; 620) for use in combination with a computer game, wherein the avatar (310; 410; 620) is created by a method according to example 23.

27. Avatar (310; 410; 620) according to example 26 for use in combination with a computer game, wherein the avatar (310; 410; 620) is created in a cubicle according to example 10.

28. Computer game with an avatar (310; 410; 620) according to one of examples 26 or 27.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A cubicle, comprising:
a scanning means for capturing spatial coordinates of a plurality of points on a user within the cubicle using radiation that does not penetrate through clothes worn by the user;
a computing means for generating, based on inputs received from the scanning means indicating the spatial coordinates of the plurality of points, optimized shape parameters defining physical properties of a body shape of the user and optimized orientation parameters defining orientations between two adjacent partial regions of the body shape;
an interaction means for selecting an article of clothing from a plurality of articles of clothing;
a display means for visually depicting a virtual reality environment and also depicting graphical representation of the user within the virtual reality environment, the graphical representation of the user having body proportions substantially similar to the user based on the optimized shape parameters and the optimized orientation parameters, wherein selection of the article of clothing via the interaction means causes the display means to further display a graphical representation of the article of clothing on top of the graphical representation of the user, the graphical representation of the article of clothing adapted to conform to the body proportions of the user, and further causes the display means to adapt the virtual reality environment to represent a typical environment in which the article of clothing is worn;
an inner frame of surfaces forming an enclosed area; and
an outer frame of surfaces surrounding the inner frame of surfaces such that an open space exists between the inner frame of surfaces and the outer frame of surfaces, wherein the open space includes the scanning means, the computing means, the display means.

2. The cubicle of claim 1, wherein the computing means is further for:
determining a reference shell for the user from the captured spatial coordinates of the plurality of points on the user, the body shape of the user lying substantially within the reference shell;
determining, from the reference shell, a reference body type comprising shape parameters defining and orientation parameters of the reference body type, the reference body type one of a plurality of statistical models of possible body types; and
deforming the reference body type by adapting the shape parameters and the orientation parameters to determine the optimized shape parameters and the optimized orientation parameters.

3. The cubicle of claim 1, wherein the interaction means is further for modifying the article of clothing by modifying one or more of a size characteristic, length characteristic, color characteristic, or material characteristic, wherein modification of the article of clothing causes the display means to update the graphical representation of the article of clothing according to the modification.

4. The cubicle of claim 1, wherein the interaction means is further for selecting a second article of clothing from the plurality of articles of clothing, and wherein selection of the second article of clothing causes the display means to further display the graphical representation of the article of clothing as a first layer of clothing and the second article of clothing as a second layer of clothing, the first layer of clothing and the second layer of clothing layered on top of the graphical representation of the user, the first layer of clothing and the second layer of clothing adapted to conform to the body proportions of the user.

5. The cubicle of claim 1, wherein
the interaction means is further for selecting a second article of clothing from the plurality of articles of clothing; and
wherein the display means comprises a plurality of displays, wherein the graphical representation of the article of clothing and the graphical representation of the user are displayed on a first display of the plurality of displays, wherein selection of the second article of clothing causes a second display of the plurality of displays to display a graphical representation of the second article of clothing layered on top of the graphical representation of the user.

6. The cubicle of claim 1, wherein:
the interaction means is further for selecting pre-stored data for an alternative graphical representation of the user, and wherein selection of the pre-stored data causes the display means to update the graphical representation of the user with the alternative graphical representation of the user.

7. The cubicle of claim 1, wherein:
the scanning means is further for recording a movement pattern of the user within the cubicle; and
wherein the display means is further for updating the graphical representation of the article of clothing layered on top of the graphical representation of the user in accordance with the movement pattern of the user.

8. The cubicle of claim 1, wherein the interaction means is for selecting the article of clothing via voice or gesture control.

9. The cubicle of claim 1, wherein the open space between the inner frame of surfaces and the outer frame of surfaces further includes the interaction means.

10. The cubicle of claim 1, wherein the interaction means is further for selecting a computer game, and wherein the graphical representation of the user represents an avatar in the computer game.

11. A method for identifying a body shape of a user in a cubicle and presenting a graphical representation of an article of clothing on a graphical representation of the user that is substantially similar to the body shape of the user, the method comprising:
 capturing, via a scanning device, spatial coordinates of a plurality of points on the user using radiation that does not penetrate through articles of clothing worn by the user;
 generating, according to the spatial coordinates of the plurality of points, optimized shape parameters defining physical properties of the body shape of the user and optimized orientation parameters defining orientations between two adjacent partial regions of the body shape;
 receiving, via an interaction unit, a selection of an article of clothing from a plurality of articles of clothing; and
 displaying, on one or more displays within the cubicle, a virtual reality environment and a graphical representation of the user within the virtual reality environment, the graphical representation of the user depicting body proportions substantially similar to the user based on the optimized shape parameters and the optimized orientation parameters,
 wherein selection of the article of clothing causes the one or more displays to further display the graphical representation of the article of clothing on top of the graphical representation of the user, the graphical representation of the article of clothing adapted to conform to the body proportions of the user, and further causes the one or more displays to adapt the virtual reality environment to represent a typical environment in which the article of clothing is worn.

12. The method of claim 11, wherein the optimized shape parameters and optimized orientation parameters are generated by:
 determining a reference shell for the user from the captured spatial coordinates of the plurality of points on the user, the body shape of the user lying substantially within the reference shell,
determining, from the reference shell, a reference body type comprising shape parameters and orientation parameters of the reference body type, the reference body type based on one of a plurality of statistical models of possible body types, and
 deforming the reference body type by adapting the shape parameters and the orientation parameters to determine the optimized shape parameters and the optimized orientation parameters to fit the body proportions of the user.

13. The method of claim 11, further comprising:
 detecting, by the scanning device, movement by the user within the cubicle;
 substantially simultaneously updating, in response to detection of the movement by the user, the graphical representation of the user to imitate the movement of the user; and updating the virtual reality environment in accordance with a direction of the movement by the user.

14. The method of claim 11, further comprising:
receiving, via the interaction unit, a selection for modifying the article of clothing by modifying one or more of a size characteristic, length characteristic, color characteristic, or material characteristic, wherein modification of the article of clothing causes the one or more displays to update the graphical representation of the article of clothing according to the modification.

15. The method of claim 11, further comprising:
receiving, via the interaction unit, a second selection for a second article of clothing from the plurality of articles of clothing, wherein selection of the second article of clothing causes the one or more displays to further display the graphical representation of the article of clothing as a first layer of clothing and the second article of clothing as a second layer of clothing, the first layer of clothing and the second layer of clothing layered on top of the graphical representation of the user, the first layer of clothing and the second layer of clothing adapted to conform to the body proportions of the user.

16. The method of claim 11, further comprising:
receiving, via the interaction unit, a second selection for a second article of clothing from the plurality of articles of clothing,
wherein the graphical representation of the article of clothing and the graphical representation of the user are displayed on a first display of the one or more displays, and wherein selection of the second article of clothing causes a second display of the one or more displays to display a graphical representation of the second article of clothing layered on top of the graphical representation of the user.

17. The method of claim 11, further comprising:
receiving, via the interaction unit, a selection for pre-stored data for an alternative graphical representation of the user, wherein selection of the pre-stored data causes the one or more displays to update the graphical representation of the user with the alternative graphical representation of the user.

18. The method of claim 11, further comprising:
receiving, via the scanning device, a recorded movement pattern of the user within the cubicle; and
updating, on the one or more displays, the graphical representation of the article of clothing layered on top of the graphical representation of the user in accordance with the movement pattern of the user.

19. The method of claim 11, further comprising:
displaying a heatmap overlaid on the graphical representation of the user that depicts pressure distribution on the graphical representation of the user caused by the article of clothing;
receiving a selection identifying a modification of the article of clothing; and
in response to receiving the selection, displaying a modified heatmap showing updated pressure distribution caused by the modification of the article of clothing, the modified heatmap overlaid on the graphical representation of the user.

20. The method of claim 19, wherein the modification of the article of clothing includes a selection of a new article of clothing, and wherein the method further comprises alternating voltages of different frequencies on the one or more displays within the cubicle to provide haptic feedback simulating various textures of the new article of clothing.

* * * * *